United States Patent Office 3,058,933
Patented Oct. 16, 1962

3,058,933
COMPOSITIONS COMPRISING THERMOPLASTIC RESIN AND VINYL CYCLIC ACETAL COMPOUND
Carol Kazuo Ikeda, Wallingford, Pa., assignor to E. I. du Pont de Nemours and Company, Wilmington, Del., a corporation of Delaware
No Drawing. Filed Oct. 13, 1960, Ser. No. 62,343
9 Claims. (Cl. 260—17)

This invention relates to resinous coating compositions and products prepared therefrom.

The objects of this invention are to provide thermoplastic resinous film-forming compositions, as well as impregnants, coatings and films made therefrom.

The objects of this invention are accomplished by dispersing or dissolving thermoplastic organic film-forming polymers in or with a new class of chemical compounds, defined hereinafter, in the absence or presence of a volatile solvent and forming impregnants, coatings or films from the resulting dispersions or solutions.

The new class of chemical compounds which are employed in this invention as a solvent or dispersing medium for thermoplastic resinous materials or as a cosolute therewith in forming new and improved impregnants, coatings or films are characterized by being capable of forming films per se and are converted to the insoluble stage upon drying in the presence of oxygen (air). Preferably, such compounds are liquids at room temperature. The new class of chemical compounds referred to above are characterized by having a plurality of radicals having the following structural formula:

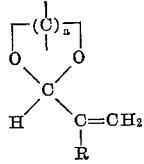

in which

represents carbon atoms in the ring, "$a$" being an integer having a value of at least 2, all but 1 of the valences of said carbon atoms being satisfied by monovalent radicals of the class consisting of hydrogen, alkyl, aryl, alkaryl, aralkyl, chloroalkyl, fluoroalkyl, alkoxyalkyl, cyano, chloroalkoxyalkyl, fluoroalkoxyalkyl, cyanoalkoxylalky, cyanoalkyl, alkenyl, chloroaryl and fluoroaryl when the value of "$a$" is 2; and consisting additionally of fluoro, chloro, acylamido, and phenylsulfonyl when the value of "$a$" is greater than 2; and in which R is a monovalent radical of the class consisting of hydrogen, alkyl, alkenyl, aryl, chloro, fluoro, bromo, cyano, acyloxy, chloroalkyl, fluoroalkyl, cyanoalkyl, alkoxy, aryloxy, and carbalkoxy. The unsatisfied valence of one of the carbon atoms in the chain represented by

is the valence through which the cyclic radical is connected to the remainder of the compound.

One preferred group of the aforementioned compounds are monomeric compounds, preferably liquid monomeric compounds, containing about from 2 to 6, inclusive, of the aforementioned radicals which will be referred to hereinafter as "2-vinyl-1,3-cyclic acetal radicals" or merely "vinyl cyclic acetal radicals." Broadly, the polyvalent radical which connects the plurality of vinyl cyclic acetal radicals in such compounds is not critical. Examples of connecting radicals are adipate, diglycolate, thiodipropionate, imidodiacetate, oxysuccinate, maleate, itaconate, phthalate, pyromellitate, orthoformate, 2-methyl-3-nitrobutane-1,2-dicarboxylate, 2,2'-di(oxyethyl)ether, 2,2'-di(oxyphenyl) propane, 1,1,1-tri(oxymethyl) propane, ethylene and hexamethylene radicals. Generally, interposed polyvalent radicals containing in the chain of atoms directly connecting the vinyl cyclic acetal radicals at least two different atoms at least one of which is carbon are preferred, and, of these, compounds in which the interposed polyvalent radical comprises a carboxylate radical, especially an aliphatic, aromatic or cycloaliphatic dicarboxylate radical, usually on the order of 2 to 12 carbon atoms, are particularly preferred. The polyvalent connecting radical can be bonded directly to the vinyl cyclic acetal radicals or, as shown below, bonded thereto through an interposed substituent or bridging radical, for example, a 1 to 18 carbon-atom alkyl substituent, on the vinyl cyclic acetal rings. Specific examples of monomeric compounds containing the cyclic acetal radicals which are useful in this invention includes bis(2-vinyl-1,3-dioxolane-4-alkyl) phthalate, bis(2-vinyl-1,3-dioxane-5-alkyl) phthalate, bis(2-vinyl-1,3-dioxepane-5-alkyl) phthalate, bis(2-vinyl-1,3-dioxocane-5-alkyl) phthalate, and the corresponding esters of isophthalic, terephthalic, tetrahydrophthalic, adipic, sebacic, pyromellitic, tetrahydronaphthalene-1,2,6,7-tetracarboxylic, citric, citraconic, itaconic and maleic acids. In the above listed compounds, the alkyl radical can have, for example, 1 to 18 carbon atoms; alternately the aforementioned carboxylate moieties can be connected directly to the vinyl cyclic acetal ring, as in the case, for example, of bis(2-vinyl-1,3-dioxane-5-yl) carboxylates. Examples of monomeric compounds other than polycarboxylic acid esters which can be used as the acetal component of the compositions of this invention are the tricyanurate obtained by reacting triallylcyanurate with 5-hydroxymethyl-5-methyl-2-vinyl-1,3-dioxane, 1,2-bis(2-vinyl-1,3-dioxane) ethylene, ethylene bis(2-vinyl-4-octyl-1,3-dioxolane-5-yl) octoate, the triorthoaluminate obtained by reacting aluminum triisopropoxide with 4-hydroxybutyl-2-vinyl-1,3-dioxolane and the diether obtained by reacting 2-vinyl-4-(beta-hydroxyethoxyethoxy methyl)-1,3-dioxolane with the dimethyl ether of dimethoylol urea.

Another group of compounds containing a plurality of vinyl cyclic acetal radicals which find particular utility in the coating compositions, which form one embodiment of this invention and are described more fully hereinafter, are polymers containing pendant vinyl cyclic acetal radicals. Among such pendant polymers are those having a wholly carbon main chain and a plurality of the aforementioned vinyl cyclic acetal radicals connected thereto through an ester linkage. Examples of such polymers are polymers of acrylic esters, for example, methyl methacrylate, butyl methacrylate, hexyl methacrylate, octyl methacrylate, decyl methacrylate, stearyl methacrylate, methyl acrylate, ethyl acrylate, isobutyl acrylate, 2-ethylhexyl acrylate, dimethyl itaconate or mixtures thereof transesterified with a hydroxy-substituted vinyl cyclic acetal. Such exemplary polymers contain a hydrocarbon chain and pendant vinyl cyclic acetal radicals connected to the chain through an interposed ester linkage. Of the aforementioned polymers, most marked improvement is obtained with those having a relative viscosity, measured as a 0.5% by weight solution in xylene at 25° C., of about 1.03 or less and, usually, containing 50% by weight or more of a 3 to 6 carbon-atom acrylate.

Other compounds which can be used as the acetal component are, for example, those in which the alpha-carbon atom of the 2-vinyl substituent, instead of hydrogen as in the above compounds, is a methyl, ethyl, propyl, butyl, vinyl, phenyl, chloro, fluoro, bromo, cyano, acetoxy, butyroxy, benzoyl, chloromethyl, fluoroethyl, cyanoethyl, methoxy, butoxy, phenoxy, carbomethoxy or carboethoxy group such as bis(2-isopropenyl-1,3-dioxolane) itaconate, polymers transesterified with 4-hydroxybutyl-2-isopropenyl-1,3-dioxolane and so forth. Still other such compounds are those in which one or more of the carbon atoms represented by $$(\overset{|}{\underset{|}{C}})_a$$

in the aforementioned formula bear, instead of hydrogen or alkyl groups as shown above, for example, a phenyl, tolyl, phenylethyl, chloroethyl, fluoroethyl, ethoxyethyl, cyano, chloroethoxyethyl, fluoroethoxyethyl, cyanoethoxyethyl, cyanoethyl, vinyl, chlorophenyl, fluorophenyl, chloro, fluoro, acetamido or phenylsulfonyl group such as bis[2-vinyl-4-(para-tolyl)-1,3-dioxolane-5-carbomethoxy]butane and bis(2-vinyl-5-cyano-1,3-dioxolane-5-oxyethyloxyethyl) adipate.

The new chemical compounds, that is, vinyl cyclic acetals, per se, which comply with the hereinbefore defined formula, contain substituents of the specified classes and are useful in carrying out this invention are disclosed and claimed in copending applications, Serial No. 683,021, filed September 10, 1957, now abandoned; Serial No. 730,070, filed April 22, 1958, now abandoned; Serial No. 737,506, filed May 26, 1958; and Serial No. 737,507, filed May 26, 1958.

It has been found that these new compounds, that is, the compounds containing a plurality of vinyl cyclic acetal radicals which form one of the two essential components of the compositions of this invention, have the unexpected and unique property of polymerizing and becoming insoluble in liquids which are solvents for the starting compounds when such compounds are exposed to oxygen. This property distinguishes these new compounds from other vinyl-containing compounds the polymerization of which is inhibited by oxygen. This insolubilization is brought about most quickly and effectively in the presence of a small proportion of the kind of siccative metal compounds used as paint driers.

Analyses by chemical and infra-red absorption techniques indicate that this property evolves as a result of a new and unique mechanism in which oxygen is absorbed, acrylic ester and hydroxyl structures progressively appear, and the cyclic acetal structure and vinyl unsaturation progressively disappear as the insolubilization proceeds.

The characteristic common to all of these new compounds is the presence of a plurality of the radicals for which the structural formula is shown above. It is to be understood that a substituent other than hydrogen can be attached to the alpha-carbon atom of the vinyl radical as indicated, that the carbon atoms in the ring can vary in number as indicated and can have substituents as indicated.

In place of polyvinyl chloride in the following examples, it is to be understood that copolymers of vinyl chloride and other monomers copolymerizable therewith, such as, e.g. vinyl acetate, vinylidene chloride, vinyl fluoride, vinylidene fluoride, diethyl and dimethyl fumarate, esters of acrylic acid, esters of methacrylic acid, can be used as the thermoplastic component of the compositions of this invention. In the case of the copolymers, the major component of the polymer is vinyl chloride, preferably not less than about 80% vinyl chloride. In place of polymethyl methacrylate and polybutyl methacrylate in the following examples, it is to be understood that other alkyl (e.g. 1 to 8 carbon) methacrylates and acrylates can be used. Additional thermoplastic resins include polyvinyl butyral, polyvinyl formal, acylated cellulose and a wide variety of other thermoplastic polymers including those described hereinafter with reference to coating compositions which are used in fields similar to conventional paints, varnishes and lacquers.

As indicated by Example VII, metal driers are not essential in carrying out this invention. They are incorporated in some of the preferred embodiments to speed up the drying or curing cycle for the dioxolane, dioxane, dioxepane, dioxocane, dioxonane and other cyclic acetal compounds.

In addition to the plastisol and solution type of coating compositions, it is within the scope of this invention to prepare calender type of compositions wherein the ingredients of the compositions are masticated on roller mills as in the case of elastomeric calender type compositions. In the case of calender type coatings, it is desirable to incorporate heat stabilizers for the preformed thermoplastic polymer.

The compositions of this invention are particularly useful for preparing unsupported films, coated and/or impregnated fabrics and coated papers. The compositions of this invention are also useful as ingredients or binders for non-woven fibrous webs, such as, e.g., those made from both natural and synthetic fibers, such as, e.g., those made from cotton, rayon, nylon, polyacrylonitrile, polyethylene terephthalate, polytetrafluoroethylene, as well as mixtures of aforementioned fibers. It is contemplated that impregnated and/or coated non-woven fibrous webs made with the compositions of this invention will range from paper-like products to leather-like products. The compositions of this invention are particularly useful as the binder for fibrous webs in producing paper-like sheets, such as, e.g., those made from wood pulp.

Although, because of their outstanding air-drying properties, the vinyl cyclic acetals used as one component of the compositions of this invention are, per se, extremely useful as film-forming materials, the adaptation of such vinyl cyclic acetals to commercial coating-composition applications as a replacement for conventional paints, varnishes and lacquers presents several problems. First, when vinyl cyclic acetals falling within the aforementioned class, particularly liquid monomeric compounds, are coated onto vertical or inclined surfaces, they sag, that is, they run down the coated surface and, in some cases, the surface may be left with substantially no film-forming material thereon. Secondly, pigments cannot be readily dispersed in liquid monomeric vinyl cyclic acetals; thus, coating compositions containing such acetals often show flooding, pigment flocculation, reduced gloss and reduced durability. Finally, vinyl cyclic acetals, generally, remain wet until shortly before they become tack-free. Thus, for example, a coating composition containing a vinyl cyclic acetal which air dries to the tack-free state in three hours, may remain wet for at least two hours and, therefore, is very likely to collect dust and dirt while it is drying.

One embodiment of this invention provides coating compositions which do not sag and which have greatly improved pigment dispersing properties, thus markedly reduced flooding and improved gloss and durability. Certain of the compositions falling within this embodiment also require markedly reduced time to reach the dust-free state and, in addition, become tack-free more rapidly than coating compositions containing as the sole film-forming materials the cyclic vinyl cyclic acetals, per se.

The coating compositions provided by the aforementioned embodiment of this invention are liquid coating compositions comprising 100 parts by weight of a compatible blend of at least one vinyl cyclic acetal compound bearing a plurality of radicals having the formula shown hereinbefore and up to about 40 parts by weight of thermoplastic resin.

Examples of thermoplastic resins particularly useful in the coating compositions of the aforementioned embodiment of this invention, which coating compositions can be used as replacements for conventional paints, lacquers and varnishes, are homopolymers and copolymers of acrylic esters, that is, esters of acrylic and alpha-substituted acrylic acids, such as methyl acrylate, ethyl acrylate, propyl acrylate, isopropyl acrylate, isobutyl acrylate, amyl acrylate, octyl acrylate, 2-ethyl hexyl acrylate, methyl methacrylate, ethyl methacrylate, butyl methacrylate, lauryl methacrylate, stearyl methacrylate, methyl ethacrylate, benzyl acrylate, butoxyethyl methacrylate and dimethyl itaconate; acylated cellulose, that is, esters of cellulose with carboxylic acids, and preferably 1 to 6 carbon atom monocarboxylic acids, such as cellulose acetate, cellulose acetate butyrate, cellulose acetate sorbate, cellulose acetate propionate, cellulose butyrate, cellulose propionate and succinylated cellulose acetate butyrate; homopolymers and copolymers of vinyl esters, that is, monocarboxylic acid esters of vinyl alcohol, such as vinyl acetate, vinyl propionate, vinyl butyrate, vinyl caprolate, vinyl laurate, vinyl palmitate, vinyl benzoate and vinyl 2-ethylhexoate; copolymers of vinyl or vinylidene chloride with maleic, fumaric or acrylic acid esters; homopolymers and copolymers of styrene; nitrocellulose, sucrose acetate butyrate and mixtures thereof.

The compositions of the aforementioned preferred embodiment are a compatible blend. Compatibility of the thermoplastic resin and vinyl cyclic acetals of this embodiment of the subject invention can be determined by forming a liquid mixture of the components, coating the resulting composition onto a panel and drying the resulting unpigmented product. Incompatibility is evidenced by a white, often opaque, appearance of the unpigmented film coupled with roughness and often discontinuities therein; compatible blends are preferably clear, although a slight haze in blends to be used for pigmented compositions is not objectionable. Although certain thermoplastic resins such as vinyl chloride homopolymers can be solubilized in the vinyl cyclic acetals at elevated temperatures to yield clear homogeneous compatible films, thermoplastic resins such as acylated cellulose and acrylic ester polymers which are soluble in the vinyl cyclic acetals at room temperatures are preferred in paint, lacquer and varnish replacements.

As mentioned hereinbefore, up to about 40% of thermoplastic resin based on the weight of blend is preferably employed in the embodiment of this invention which provides improved coating compositions which can be used as a substitute for conventional paints, varnishes and lacquers. Within the aforementioned limit, the preferred amount of thermoplastic resin varies considerably with the particular thermoplastic resin employed and its particular molecular weight and viscosity, the amount of solvent employed, and the proposed use thereof, for example, the substrate to be coated therewith and the urgency of properties in addition to excellent sag resistance and pigment dispersing. With lacquer- or dope-grade nitrocellulose (average viscosity on the order of ¼ to 500 seconds), excellent sag resistance and greatly improved pigment dispersion is obtained with about from ¼ to 2% of thermoplastic resin. With lacquer-grade acrylic esters (molecular weight on the order of 30,000 to 150,000), optimum properties are usually obtained at about from 20 to 30 parts of polymer per 100 parts of blend. With acylated cellulose, intermediate portions on the order of 5 to 15% are normally employed for optimum sag resistance and pigment dispersion, while amounts comparable to those used for acrylic polymers are employed if markedly reduced dust-free time is an additional requirement. In general, the amount of thermoplastic polymer decreases with the amount, if any, of solvent and as the molecular weight and viscosity of the thermoplastic polymer increases. If an excess of any particular thermoplastic polymer is employed, the leveling and build of the resulting composition is usually markedly reduced. Leveling refers to the ability of a coating composition to flow out into a smooth uniform coating free of brush marks or spray orange peel. Build refers to the ability of a coating composition to fill scratches or other blemishes in a substrate without leaving an indentation or other irregularity in the surface of the dry coating. Application properties such as brushing and spraying characteristics, are also usually adversely affected by excess thermoplastic polymer. Also, particularly if one of the preferred liquid monomeric vinyl cyclic acetals is employed, excess thermoplastic polymer may necessitate added solvent in order to provide a blend with a suitable application viscosity; thus, the solids content of the resulting composition is reduced.

Homopolymers and copolymers, acrylic esters and particularly those containing at least 50%, and preferably 75% or more of methyl methacrylate and acylated cellulose, particularly cellulose acetate butyrate, are preferred in coating compositions used as a replacement for conventional paints, lacquers and varnishes. First, compositions containing such preferred thermoplastic resins have excellent sag resistance, pigment dispersing properties and improved durability. Secondly, they have markedly reduced dust-free time and an improved rate of cure to the hard, tack-free state. In this respect, compositions modified with polymers of methyl methacrylate and cellulose acetate butyrate are particularly outstanding.

The aforementioned coating compositions which form one embodiment of this invention can be modified with conventional plasticizers such as benzyl butyl phthalate, dibutyl phthalate, diphenyl phosphate, 2-ethylhexyl benzyl phthalate, dicyclohexyl phthalate and mixtures thereof and solvents such as toluene, xylene, butyl acetate, acetone, methyl isobutyl ketone, butyl ether and mixtures thereof. Usually, except in certain cases where polymeric acetals are employed, only small portions of solvent, for example, 5 to 60% based on the total weight of composition, and little or no conventional plasticizer are required. Conventional pigments and extenders such as, for example, metal oxides, hydroxides, chromates, silicates, sulfides, sulfates, carbonates, organic dyes and lakes thereof and metal-flake pigments can be used in the compositions of this invention in conventional amounts. Other conventional additives such as inhibitors, anti-skinning agents and the like can also be used.

The coating compositions of the aforementioned preferred embodiment of this invention can be formulated by merely blending the various materials. Preferably, if the compositions are pigmented, the pigment is ground with the thermoplastic resin and some or all of the vinyl cyclic acetal until a smooth uniform dispersion is obtained, then the resulting product is diluted, if necessary, to suitable application viscosity with solvent and, if desired, additional vinyl cyclic acetal. A self-propellant aerosol coating composition can be prepared by charging one or more of the aforementioned preferred blends together with a compatible propellant, for example, one of the conventional fluorocarbon propellants or a mixture thereof, to a hermetically sealed container provided with a valve-controlled spray nozzle. Container pressures on the order of 30 to 70 pounds per square inch gauge at 70° F. depending on the container employed are normally used. Examples of propellants which can be used, usually in admixture in order to achieve desired pressures, are monochlorodifluoromethane, trichloromonofluoromethane, trichlorotrifluoroethane, dichlorodifluoromethane, dichlorotetrafluoroethane and methylene dichloride.

The coating compositions containing 100 parts by weight of a blend of vinyl cyclic acetal and up to 40 parts by weight of thermoplastic resin, which form one preferred embodiment of this invention, have excellent sag resistance and pigment dispersing properties coupled with the ability to air dry at room temperature within short periods to yield hard, flexible, solvent-resistant films and coatings. Unlike most lacquers, coating compositions of this invention form films which are glossy with little or no buffing and are very solvent resistant. Unlike conventional air-drying enamels, the coating compositions of this invention attain their cured state in relatively short periods of time, for example, 2 to 10 hours at room temperature or even less if mild baking conditions, for example, up to 150° F., are employed.

This application is a continuation-in-part of copending application Serial No. 738,034, filed May 27, 1958, now abandoned.

In the following examples, which illustrate this invention, parts and percentage figures are expressed on a weight basis unless stated otherwise.

Example 1

Particulate polyvinyl chloride is dispersed in bis(2-vinyl-1,3-dioxolane-4-butyl)sebacate ester along with a small proportion of heptane and cerium(ous) naphthenate in the following proportions:

| | Parts by weight |
|---|---|
| Particulate polyvinyl chloride ("Geon" 121) | 60.0 |
| Bis(2-vinyl-1,3-dioxolane-4-butyl) sebacate (Example 2—S.N. 683,021) | 40.0 |
| Cerium(ous) naphthenate | .3 |
| Heptane | 6.0 |
| | 106.3 |

The particulate polyvinyl chloride is dispersed in the ester in the presence of the heptane and cerium(ous) naphthenate by thoroughly mixing the above ingredients together. The composition is milky white in color. A wet film 15 mils thick is cast onto a polished surface. The film is dried at room temperature for 30 minutes followed by baking in an oven for 5 minutes at 180° C. A dry film pale tan in color, limp, slightly opaque and of good mechanical strength is stripped from the polished surface.

When the dried film is leached with cyclohexanone, the polyvinyl chloride is dissolved out leaving a skeleton or porous structure of the ester which has been converted to the insoluble stage during the drying in the presence of air (oxygen).

The flexible film of the polyvinyl chloride plasticized with the polymerized bis(2-vinyl-1,3-dioxolane-4-butyl) sebacate represents an article of commerce and is particularly useful to others for metallizing by means of vacuum distillation of aluminum and certain aluminum alloys as described in one or more of the following U.S. Patents: 2,664,852, 2,665,223, 2,665,224, 2,665,225, 2,665,226, 2,665,227, 2,665,228 and 2,665,229.

The metallized film has a highly lustrous metallic finish which is scuff resistant and particularly adapted for fabrication into ladies' handbags and evening slippers.

Example 2

Polymethyl methacrylate is dissolved in bis(2-vinyl-1,3-dioxolane-4-butyl)adipate along with a small proportion of toluene and cobalt naphthenate in the following proportions:

| | Parts by weight |
|---|---|
| Polymethyl methacrylate | 100.0 |
| Bis(2-vinyl-1,3-dioxolane-4-butyl) adipate | 170.0 |
| Toluene | 20.0 |
| Cobalt naphthenate (6% cobalt) | .1 |
| | 190.1 |

The above components are thoroughly mixed until the polymethyl methacrylate is dissolved to form a clear solution. A wet film 7 mils thick is cast on a polished metal surface. It is forced dried at 100° C. for 30 minutes. The dry film stripped from the polished surface is clear, flexible and of good mechanical strength.

The polymethyl methacrylate can be dissolved out of the film by leaching it with acetone thus leaving a skeleton or porous film of polymerized bis(2-vinyl-1,3-dioxolane-4-butyl) adipate.

The flexible film of polymethyl methacrylate and polymerized bis(2 - vinyl-1,3-dioxolane-4-butyl)adipate represents an article of commerce which can be supplied to others for further processing by applying a lustrous metallic surface layer by the vacuum distillation technique referred to in Example 1.

Equally good results are obtained when bis(2-vinyl-1,3-dioxane-5-butyl)adipate or bis[(2-vinyl-5-methyl-1,3-dioxan-5-yl)methyl]sebacate is used as a pound for pound replacement of the dioxolane ester in the above example.

*Examples 3 Through 6*

| Example | Liquid Bis(2-Vinyl-1,3-Dioxolane-4-Butyl) Phthalate, parts | Preformed Thermoplastic Polymer | Solvent |
|---|---|---|---|
| 3 | 6 | Polybutyl methacrylate—2 parts. | Acetone—8 parts. |
| 4 | 6 | Polyvinyl butyral—2 parts. | Acetone—4 parts. |
| 5 | 3 | Cellulose acetate butyrate—1 part. | Ethyl Acetate—8 parts. |
| 6 | 3 | Cellulose acetate sorbate—1 part. | Equal parts of xylene, butanol and ethanol—4 parts. |

Sufficient cobalt butyl phthalate is added to the above compositions to correspond to .05% cobalt based on the combined weight of the phthalate ester and the preformed thermoplastic polymer. The compositions of each example are thoroughly mixed to produce clear solutions. Each composition is cast onto a polished surface and then baked for 30 minutes at 60° C. The dried films, stripped from the polished surface, exhibit good mechanical strength. The phthalate ester is converted to the insoluble stage by the drying treatment. When the dried films are subjected to the solvent from which they are deposited the preformed polymer is extracted leaving a porous skeleton of an insoluble film of the polymerized phthalate ester. The dried films prepared in accordance with Examples 3, 4 and 5 have a uniformly wrinkled texture. The dried film from Example 6 is smooth, free of wrinkles and is less flexible than the films produced by Examples 3, 4 and 5.

The dried films of Examples 3 through 6 represent articles of commerce and are useful by others for decorating by vacuum distillation of metals as referred to in Example 1. The polymerized dioxolane phthalate ester being non-volatile does not migrate or volatilize in the vacuum distillation metallizing process and, therefore, does not foul the metallic finish on the film as in the case of prior art plasticizers.

Example 7

A free flowing 100% non-volatile plastisol having the following composition is prepared:

| | Parts by weight |
|---|---|
| Particulate polyvinyl chloride ("Geon" 121) | 45.0 |
| Di(2-ethyl hexyl) phthalate | 25.0 |
| Bis(2-vinyl-1,3-dioxolane-4-butyl) phthalate | 9.1 |
| Pigment (TiO$_2$) | 9.1 |
| Filler (barytes) | 9.1 |
| Epoxidized soya oil ("Paraplex" G-62) | 2.7 |
| | 100.0 |

The above composition is prepared according to the well known process of preparing plastisol compositions, i.e., the pigment and filler are dispersed in the phthalate esters by any conventional method of grinding pigments and fillers to form a mill base. The particulate polyvinyl chloride is then dispersed in the mill base by a simple mixing or stirring operation.

The viscosity of the plastisol composition is sufficiently stable that it can be packaged and sold as an article of commerce useful for coating a variety of surfaces, such as, e.g., woven and unwoven fabrics, papers, leathers, metals, wood, etc.

The above described plastisol is a free flowing composition having a viscosity of 7,500 centipoises at room temperature which is much thinner in viscosity than a similar composition which has a viscosity of 30,000 centipoises at room temperature. The two compositions differ only in that the former comprises the dioxolane ester.

The plastisol composition is applied to each side of a woven cotton fabric running 2.30 yards per pound per 59″ width by means of a doctor knife. Approximately 1.5 ounces of the coating composition is applied to each side of the fabric. After each coat, the coated fabric is passed through a heat zone where the coating is heated to about 325 to 350° F. At the elevated temperature, the phthalate esters become solvents for the polyvinyl chloride and dissolve or fuse the particles together. Upon cooling of the fused coating, a tough wear-resistant coating is formed. The dioxolane phthalate ester is converted to the insoluble stage during the fusing operation.

The cotton fabric is uniformly coated on each side and the interstices of the fabric being completely filled. The product is particularly useful as a window shade material.

Fused films about 8 mils thick prepared from the plastisol composition in the above example and the control composition without the dioxolane ester, having the following properties:

|  | Properties of Unsupported Film | |
|---|---|---|
|  | Tensile Strength, p.s.i. | Percent Elongation at Breaking Point |
| Example 7 | 5,824 | 375 |
| Control | 2,250 | 238 |

The above viscosity, tensile and elongation data show that the presence of the dioxolane ester reduces the viscosity of the plastisol, increases the tensile strength and increases the elasticity of the resulting film. This is a surprising result since increase in tensile strength is normally accompanied by loss of extensibility.

*Example 8*

A leather-like product is made by treating a non-woven web of polyethylene terephthalate fibers in accordance with the following procedure.

A non-woven web of 0.5 denier, 1½″ staple polyethylene terephthalate fibers weighing about 9 ounces per square yard, made by the well known cross lapping and needle punching techniques, is impregnated with the following plastisol composition:

| | Parts by weight |
|---|---|
| Polyvinyl chloride ("Geon" 101) | 45.0 |
| Di(2-ethyl hexyl) phthalate | 17.1 |
| Bis(2-vinyl-1,3-dioxolane-5-butyl) sebacate | 17.0 |
| Carbon black | 5.0 |
| Calcium carbonate | 13.2 |
| Epoxidized soya oil ("Paraplex" G-62) | 2.6 |
| Cobalt naphthenate (6% Co) | .1 |
| | 100.0 |

Sufficient cobalt naphthenate is incorporated into the above composition to introduce about .05% cobalt based on the weight of the dioxolane ester.

The impregnated fabric is passed between squeeze rolls to thoroughly impregnate the web. The impregnated web is subjected to a temperature of about 200° F. for 30 minutes to cure or insolubilize the dioxane ester and coalesce the polyvinyl chloride particles. Following the curing operation, the impregnated web is compressed at 50–75 p.s.i. pressure and about 100° C. to a thickness of about 50 mils to form a porous leather-like product useful as a leather replacement.

*Examples 9 to 12*

Four coating compositions are prepared by blending the following materials:

| | Example 9 | Example 10 | Example 11 | Example 12 |
|---|---|---|---|---|
| Mill base | 200 | 200 | 200 | 200 |
| Butyraldehyde oxime-anti-skinning agent | 0.2 | 0.2 | 0.2 | 0.2 |
| Cobalt butyl phthalate drier (4% solution in toluene) | 1.95 | 1.91 | 1.87 | 1.84 |
| Aromatic hydrocarbon solvent (B.P. 150–190° C., aniline pt. −28° C.) | 10 | 15 | 35 | 50 |

The mill bases used in the above compositions are prepared by grinding together the following materials until smooth, uniform dispersions are obtained:

| | Example 9 | Example 10 | Example 11 | Example 12 |
|---|---|---|---|---|
| Mixture of bis(2-vinyl-1,3-dioxolane-4-butyl) itaconate, mesaconate and citraconate | 935.0 | 935.0 | 935.0 | 935.0 |
| Cellulose acetate butyrate (½-second viscosity) | 9.4 | 28.0 | 46.8 | 65.4 |
| Poly(dimethyl) siloxane wetting agent (5% solution in toluene) | 4.7 | 4.7 | 4.7 | 4.7 |
| Titanium dioxide pigment | 880.8 | 897.0 | 913.6 | 929.8 |

The finished compositions above have Stormer viscosities, in Krebs units, of 72, 83, 80 and 82, respectively, and contain 1%, 2.9%, 4.8% and 6.5% of cellulose acetate butyrate, respectively, based on the total weight of thermoplastic resin and cyclic acetal.

The composition of Example 9 described above has marginal sag resistance, but has excellent flow and leveling properties. The composition of Example 10 has good sag resistance and very good flow and leveling properties. Panels coated with the compositions of Examples 11 and 12 show no evidence of sagging and excellent flow and leveling. The compositions of Examples 11 and 12 also have outstanding brush application properties, that is, they spread easily into a smooth film with a minimum of brush resistance. The compositions of this invention described above also show excellent pigment-dispersing properties and exhibit no pigment flocculation, flooding or settling. The compositions air-dry to a hard tack-free state within about 4 to 6 hours at room temperature.

If the procedure described above is repeated excepting that no cellulose acetate butyrate is employed, a coating of the resulting composition applied on a vertical or inclined surface drains substantially completely therefrom. Also, stable pigment dispersions cannot be made with such a composition. In addition, such a composition is extremely sticky and gummy and difficult to brush.

Results similar to those above are obtained if an equal weight of, for example, bis(2-vinyl-5-methyl-1,3-dioxane-5-methyl) terephthalate, bis(2-vinyl-1,3-dioxepane-4-butyl) sebacate or bis(2-isopropenyl-1,3-dioxolane-4-butyl) itaconate is substituted for the vinyl cyclic acetals used in the compositions of Examples 9 to 12.

*Examples 13 to 15*

A mill base is prepared by grinding together 80.9 parts of titanium dioxide pigment, 47.8 parts of a 40% solution in a mixture of 70% toluene and 30% acetone of a homopolymer of methyl methacrylate and 30.3 parts of xylene. Three coating compositions are prepared from the following materials:

| | Example 13 | Example 14 | Example 15 |
|---|---|---|---|
| Mill base described above | 100 | 100 | 100 |
| Bis(2-vinyl-1,3-dioxolane-4-butyl) itaconate | 108 | 96 | 84 |
| Copolymer of 98% of methyl methacrylate and 2% of methacrylic acid (40% solution in mixture of 70% toluene and 30% acetone) | 0 | 30 | 60 |
| Cobalt butyl phthalate drier (4% solution in toluene) | 2.7 | 2.2 | 2.1 |

The compositions of Examples 13 to 15, which contain 10%, 20% and 30% of polymer of methyl methacrylate based on the total weight of the blend with vinyl cyclic acetal, are diluted to 77%, 65% and 60% solids, respectively, then coated onto glass panels at a 2-mil dry-coating thickness. The compositions have dust-free times of 270, 132 and 30 minutes, respectively, are tack-free in 290, 182 and 150 minutes, have excellent build, have fair, good and excellent sag resistance, respectively, and have good flow, leveling and pigment dispersing properties. As a comparison, if the polymethyl methacrylate is omitted from the above compositions, the resulting products sag very severely, have very good pigment dispersing properties and have dust-free and tack-free times of 300 and 390 minutes, respectively.

Similar results are obtained if the diether of 4-hydroxymethyl-2-vinyl-1,3-dioxolane or bis(2-vinyl-1,3-dioxan-4-yl) ethane is substituted for the vinyl cyclic acetal used above.

*Example 16*

One hundred parts of a solid copolymer of 55% of methyl methacrylate and 45% of ethyl acrylate ("Acryloid" B–82) are dissolved in 150 parts of toluene, then 77 parts of the resulting solution are blended with 70 parts of bis(2-vinyl-1,3-dioxolane-4-butyl) itaconate. To the resulting solution are added 1.8 parts of a 4% solution in toluene of cobalt butyl phthalate (0.05% cobalt based on the weight of cyclic acetal). The resulting composition, knife coated onto a panel at a dry-film thickness of 2 mils and air dried at room temperature, achieves a dust-free state in 140 minutes and a tack-free state in 175 minutes. It has excellent sag resistance and good leveling properties. Without the aforementioned copolymer of methyl methacrylate and ethyl acrylate, the resulting composition has a dust-free time of about 4½ hours, a tack-free time of about 5 hours and flows readily from any inclined or vertical surface.

Similar results are obtained if the 4-hydroxybutyl-2-vinyl-1,3-dioxolane diester of maleic acid, 2,3-dicarboxybicyclo-(2.2.1)-5-heptene acid or 1,2-dicarboxycyclohexene-4 acid are substituted for the itaconic acid diester used above.

*Example 17*

The procedure described in the preceding example is repeated excepting that, as the thermoplastic polymer, a copolymer of 80% of methyl methacrylate and 20% of lauryl methacrylate is employed. Coatings of the resulting composition have a dust-free time of 2 hours at room temperature and a tack-free time of about 3½ hours. The composition has excellent sag resistance and is glossy and clear.

*Example 18*

A mill base is prepared by grinding together 3,000 parts of a 40% solution in a mixture of 70% of toluene and 30% of acetone of a copolymer of 98% of methyl methacrylate and 2% of methacrylic acid, 6,000 parts of titanium dioxide pigment and 2,000 parts of toluene. The following materials are then blended together:

| | Parts by weight |
|---|---|
| Mill base described above | 428.5 |
| Dimethyl silicone oil | 0.125 |
| Copolymer of 98% of methyl methacrylate and 2% of methacrylic acid (40% solution in mixture of 70% toluene and 30% acetone) | 62.5 |
| Bis(2-vinyl-1,3-dioxolane - 4 - butyl) orthophthalate | 175 |
| Cobalt butyl phthalate (4% solution in toluene) | 6.25 |
| Toluene | 295 |

In the above composition, the blend of film-forming materials consists of about 70% of vinyl cyclic acetal and 30% of thermoplastic resin.

A self-propelled aerosol paint is prepared by charging 260 parts of the above to a hermetically sealed container equipped with a conventional valve-controlled spray nozzel, then charging thereto 85 parts of trichloromonofluoromethane and 127 parts of monochlorodifluoromethane. The resulting product has a pressure at 77° F. of 51 pounds per square inch gauge. When the resulting composition is sprayed onto a test panel, the resulting coating has a dust-free time of 45 minutes. Also, the composition has good sag resistance and pigment dispersing properties.

*Example 19*

A solution is prepared by mixing together 50 parts of bis(2-vinyl-1,3-dioxolane - 4 - butyl) orthophthalate, 50 parts of bis(2-vinyl-1,3-dioxolane-4-butyl) itaconate and 6 parts of a 4% solution of cobalt butyl phthalate in toluene. Sixteen parts of the aforementioned solution are mixed with 50 parts of a 10% solution of ½-second ethyl cellulose. When the resulting composition is sprayed onto a panel it dries to the dust-free state in 1 hour and is tack-free within about 90 minutes. If the ethyl cellulose is omitted from the above composition, the dust-free time is 2½ hours and the tack-free time is about 3 hours. The above composition also has good sag resistance.

*Example 20*

The procedure described in the preceding example is repeated excepting that 25 parts of a 20% solution of a copolymer of 91% of vinyl chloride, 3% of vinyl acetate and 6% of vinyl alcohol (from hydrolyzed vinyl acetate moieties) is substituted for the ethyl cellulose solution used in that example. The product yields coatings which are dust-free within about 1 hour and tack-free within about 2 hours.

*Examples 21, 22, 23 and 24*

The following materials are blended and then ground until a smooth, uniform dispersion is obtained:

| | Parts | | | |
|---|---|---|---|---|
| | Example 21 | Example 22 | Example 23 | Example 24 |
| Mixture of bis(2-vinyl-1,3-dioxolane - 4 - butyl) mesaconate, itaconate and citraconate | 682.6 | 682.6 | 682.6 | 682.6 |
| Nitrocellulose (14% solution in mixture of 93% methyl ethyl ketone and 7% ethanol), ¼-second viscosity | 12.2 | 24.4 | 36.6 | 48.8 |
| Titanium dioxide pigment | 638 | 639 | 640.1 | 641.1 |
| Butyraldehyde oxime-antiskinning agent | 1.2 | 1.2 | 1.2 | 1.2 |
| Cobalt butyl phthalate-drier (4% solution in toluene) | 13.1 | 13.1 | 13.1 | 13.1 |
| Xylene | 67.4 | 54.4 | 34.4 | 48.5 |

The above compositions have Stormer viscosities, in Krebs units, of 93, 93, 80 and 71, respectively, and contain 0.25%, 0.5%, 0.75% and 1%, respectively, of ¼-second nitrocellulose, based on the total weight of cyclic acetal and nitrocellulose. The composition of Example 22 has an excellent balance, sag resistance and leveling. Although greatly improved over similar compositions containing no nitrocellulose, the compositions of Example 21 and Example 23 and 24 are somewhat poorer in leveling and sag resistance, respectively.

*Example 25*

The following materials are ground until a smooth, uniform mill base is obtained:

| | Parts by weight |
|---|---|
| Bis(2-vinyl-1,3-dioxolane-4 - butyl) orthophthalate | 210.5 |
| Bis(2-vinyl-1,3-dioxolane-4-butyl) itaconate | 210.5 |
| Titanium dioxide pigment | 219.8 |
| Sun yellow pigment | 108.5 |
| Ferrite yellow pigment | 28.8 |

Separately, 361.0 parts of a 2.4% solution of 350-second nitrocellulose in butyl acetate are blended with 582 parts of bis(2-vinyl-1,3-dioxolane-4-butyl) orthophthalate and 57.5 parts of bis(2-vinyl-1,3-dioxolane-4-butyl) itaconate. Finally, the above compositions are blended, then mixed with 26.2 parts of a 10% solution of tetra-2-ethylhexyl titanate wetting agent, 10.8 parts of a 5% solution in acetone of dimethyl silicone oil and 69.5 parts of a 1% solution in toluene of cobalt butyl phthalate drier. The resulting composition contains 75.7% by weight of solids and 0.83% of 350-second nitrocellulose, based on the total weight of film-forming materials.

Panels coated with the above composition show good sag resistance, good flow and leveling properties, excellent adhesion, blister resistance and salt spray resistance and excellent solvent resistance and gloss. The above coating composition remains wet for about 3½ to 4 hours, but is tack-free within 4½ to 5 hours. It also has excellent pigment dispersing properties.

*Example 26*

A copolymer is prepared by first charging 24,020 parts of xylene and 11,000 parts of dimethyl itaconate and 7,000 parts of ethyl acrylate to a reaction vessel, then heating the resulting mixture to the reflux temperature, about 125° C. Next, 725 parts of ditertiarybutyl peroxide are added to the reaction mixture which is heated at the reflux temperature, about 125 to 136° C. for about 3 hours. Low boiling materials and some solvent are then stripped from the reaction mixture which is then cooled to room temperature. The resulting polymer contains 61% of dimethyl itaconate and 39% of ethyl acrylate and has a relative viscosity in a 0.5% solution in xylene at 25° C. of 1.01662.

Next, 10,500 parts of 4-hydroxybutyl-2-vinyl-1,3-dioxolane are added to the aforementioned cooled reaction mixture. After the hydroxy-substituted cyclic acetal is added, low-boiling materials including water are stripped from the reaction mixture, then 150 parts of tetraisopropyl titanate catalyst is added thereto. The reaction mixture is next heated for about 2 hours at reflux, 50 additional parts of catalyst are added thereto, then heating is continued for an additional 2½ hours at the reflux temperature, 128 to 138° C. At the end of the transesterification reaction, 76.3% of the dimethyl itaconate in the aforementioned copolymer has been transesterified with 4-hydroxybutyl-2-vinyl-1,3-dioxolane. The relative viscosity of the resulting pendant polymer (0.5% solution in xylene at 25° C.) is 1.03179.

A mill base is prepared by grinding 1,180 parts of titanium dioxide pigment with 891 parts of the aforementioned pendant polymer solution (containing 472 parts of polymer) until a smooth, uniform dispersion is obtained. Next, 1,540 parts of a 56.2% solution in xylene of the aforementioned pendant polymer is blended with 800 parts of a 25% solution in hydroxyethyl acetate of ½-second cellulose acetate butyrate. After 500 parts of an equal weight mixture of methyl ethyl ketone and hydroxyethyl acetate are added thereto, 2,071 parts of the aforementioned mill base are blended therewith. Finally, 16.4 parts of a 4% solution of cobalt butyl phthalate is added to the above mixture which is then diluted to 45% solids with hydroxyethyl acetate and sprayed on an automobile. The resulting coating has excellent leveling and flow properties, excellent sag resistance, a dust-free time of about from 15 to 25 minutes, and a tape time of about 3 to 4 hours. The above composition also has excellent pigment dispersing properties as evidenced by high gloss and freedom from flooding and pigment flocculation.

If the cellulose acetate butyrate is omitted in the above composition, the sag resistance is somewhat poorer, the dust free time is increased 2 or 3 fold and the tape time is prolonged 3 or 4 hours.

*Example 27*

300 parts of cumene solvent are brought to reflux, then 65 parts of methyl methacrylate, 35 parts of ethyl acrylate and 5 parts of cumene hydroperoxide are added thereto. The resulting reaction mixture is heated for 17 hours at its reflux temperature, 128 to 153° C., to yield a reaction mixture containing 24.47% solids corresponding to a conversion of 98%. Next, to the reaction mixture are added 200 parts of toluene and 63 parts of 4-hydroxybutyl-2-isopropenyl-1,3-dioxolane, then low-boiling materials are stripped therefrom. After two parts of tetraisopropyl titanate has been added, the reaction mixture is heated at 118° C. for about 10 hours during which time 2 more parts of tetraisopropyl titanate are added. During the reaction about 80% of the ethyl acrylate is transesterified with the 4-hydroxybutyl-2-isopropenyl-1,3-dioxolane. Finally, the resulting pendant polymer is precipitated from the reaction mixture and redissolved in toluene.

A white enamel is prepared by blending the above pendant polymer, titanium dioxide pigment and solvent by the general procedure described in Example 26. The resulting composition has acceptable leveling and sag resistance, a dust-free time of 45 minutes to 1 hour and a tape time of about from 7 to 8 hours. Tape time refers to the drying time at room temperature required before masking tape, adhered to, then stripped from the coating, does not mar the coating. The addition of 15% of cellulose acetate butyrate, based on a total weight of pendant polymer and thermoplastic resin yields a composition having a dust-free time of about 30 minutes, a tape time of 4 hours or less and somewhat improved sag resistance.

*Example 28*

3,800 parts of aromatic solvent (B.P. 150–190° C., aniline pt. −28° C.), 1,150 parts of methyl methacrylate and 770 parts of ethyl acrylate are charged to a reaction vessel and heated to reflux, then 96 parts of ditertiarybutyl peroxide are added thereto. Heating is continued at the reflux temperature, 123 to 150° C., for 2 hours, then the low boiling materials were stripped therefrom at a temperature of 150 to 166° C. over a period of 1 hour. The resulting reaction mixture contains 34.4% solids and has a Gardner-Holdt viscosity of B 1/2 LC. The above reaction mixture is next heated to 130° C., then 755 parts of 4-hydroxybutyl-2-vinyl-1,3-dioxolane are added thereto together with 1,170 parts of the aforementioned aromatic solvent. The reaction mixture is heated to strip low-boiling materials therefrom, then 16 parts of tetraisopropyl titanate are added thereto in three portions over a period of about 4 hours while the reaction mixture is held at about 160 to 170° C. Finally, heating is continued for an additional 2.5 hours at 160 to 170° C. to yield a copolymer of 60% of methyl methacrylate and 40% of ethyl acrylate in which 56.5% of the ethyl acrylate is transesterified with 4-hydroxybutyl-2-vinyl-1,3-dioxolane. A 32.6% solution of the above polymer in a blend of 42% of xylene and 58% of aromatic solvent (B.P. 150 to 190° C., aniline pt. −28° C.) has a Gardner-Holdt viscosity of A-1.

Using the general procedure described in Example 26, a coating composition is prepared having the following overall composition:

| | Parts by weight |
|---|---|
| Pendant polymer (prepared above) | 90 |
| Homopolymer of methyl methacrylate (inherent viscosity 1.15) | 10 |
| Titanium dioxide pigment | 50 |
| Solvent | 225 |

The resulting composition has good flow and leveling properties, excellent sag resistance and pigment dispersing properties, a dust-free time of about 30 minutes and tack-free time of about 2 to 3 hours. Complete cure of the above coating composition requires about 8 hours.

What is claimed is:

1. A composition of matter comprising a thermoplastic resin and a cyclic acetal compound of the class consisting of (A) monomers containing 2–6 cyclic radicals having the following structural formula:

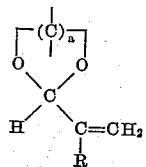

in which

represents carbon atoms in the ring, "$a$" being an integer having a value of at least 2, all but 1 of the valences of said carbon atoms being satisfied by monovalent radicals of the class consisting of hydrogen, alkyl, aryl, alkaryl, aralkyl, chloroalkyl, fluoroalkyl, alkoxyalkyl, cyano, chloroalkoxyalkyl, fluoroalkoxyalkyl, cyanoalkoxyalkyl, cyanoalkyl, alkenyl, chloroaryl and fluoroaryl when the value of "$a$" is 2, and consisting additionally of fluoro, chloro, acylamido and phenylsulfonyl when the value of "$a$" is greater than 2, and the one remaining valence connects the cyclic radical to at least one other such cyclic radical through an interposed polyvalent radical; and in which R is a monovalent radical of the class consisting of hydrogen, alkyl, alkenyl, aryl, chloro, fluoro, bromo, cyano, acyloxy chloroalkyl, fluoroalkyl, cyanoalkyl, alkoxy, aryloxy and carbalkoxy; and (B) polymers containing a plurality of cyclic radicals having said structural formula.

2. An unsupported film of the composition of claim 1.
3. A fibrous web coated with the composition of claim 1.
4. A fibrous web impregnated with the composition of claim 1.
5. A plastisol of the composition of claim 1.
6. A coating composition comprising 100 parts by weight of a compatible blend of at least one cyclic acetal compound of claim 1 and up to 40 parts by weight of thermoplastic resin.
7. A coating composition of claim 6 containing a liquid vinyl cyclic acetal diester of an ethylenically unsaturated dicarboxylic acid.
8. A coating composition of claim 6 containing 100 parts by weight of a compatible blend of liquid vinyl cyclic acetal and up to about from 20 to 30 parts by weight of at least one polymer of at least one acrylic ester.
9. A coating composition of claim 6 containing 100 parts by weight of a compatible blend of a liquid vinyl cyclic acetal and about from 5 to 15 parts by weight of at least one acylated cellulose.

References Cited in the file of this patent
UNITED STATES PATENTS
2,432,601    Wiley _____ Dec. 16, 1947

UNITED STATES PATENT OFFICE
CERTIFICATE OF CORRECTION

Patent No. 3,058,933            October 16, 1962

Carol Kazuo Ikeda

It is hereby certified that error appears in the above numbered patent requiring correction and that the said Letters Patent should read as corrected below.

Column 11, line 13, for "good" read -- poor --.

Signed and sealed this 26th day of March 1963.

(SEAL)
Attest:

ESTON G. JOHNSON
Attesting Officer

DAVID L. LADD
Commissioner of Patents